US005576921A

United States Patent [19]

Brunner

[11] Patent Number: 5,576,921

[45] Date of Patent: Nov. 19, 1996

[54] AGGREGATE CURRENT TRANSFORMER

[75] Inventor: Markus Brunner, Bessenbach, Germany

[73] Assignee: Vacuumschmelze GmbH, Hanau, Germany

[21] Appl. No.: 498,897

[22] Filed: Jul. 6, 1995

[30] Foreign Application Priority Data

Jul. 6, 1994 [DE] Germany .......................... 44 23 622.0

[51] Int. Cl.[6] .............................. H02H 3/16; H01F 17/04

[52] U.S. Cl. .............................. 361/93; 361/45; 335/281; 336/177; 336/221; 336/233

[58] Field of Search ................................. 361/42–50, 93; 336/221, 233, 10, 30, 177, 179, 216; 335/281

[56] References Cited

U.S. PATENT DOCUMENTS 5,235,488 8/1993 Koch ........................................ 361/45

FOREIGN PATENT DOCUMENTS

WO93/16479 8/1993 WIPO .

*Primary Examiner*—Jeffrey A. Gaffin
*Assistant Examiner*—Michael J. Sherry
*Attorney, Agent, or Firm*—Hill, Steadman & Simpson

[57] ABSTRACT

A sum current transformer that acts on a protective switch via an amplifier has a core of a solid metallic material composed of an alloy having more than 40% nickel, so that it can be implemented mechanically solid even given small dimensions. The temperature dependency of the arrangement caused by the ohmic resistance of the winding is compensated by the diminishing eddy currents in the core given increasing temperature, so that the smallest dimensions can be realized for the aggregate current transformer.

8 Claims, 4 Drawing Sheets

AGGREGATE CURRENT TRANSFORMER

BACKGROUND OF THE INVENTION

1. Field of the Invention

The present invention is directed to a sum current transformer having a wound, lapped core of high-permeability, soft-magnetic material for acquiring the current of current conductors passing through the core, whereby the winding of the core is connected via an amplifier to a protective switch.

2. Description of the Prior Art

A current transformer of the above general type is disclosed in PCT Application WO 93/16479. The core of this known sum current transformer can be optionally composed of sintered, ferromagnetic material, or disks stacked on top of one another, or wound bands or wires. All of these core versions have in common the fact that insulator layers are provided by small air gaps in the material or by the division into disks or by winding, these insulator layers reducing eddy currents induced in the material by the alternating field acting thereon. The result is that such cores—especially because of their small dimensions—have low mechanical strength and are therefore sensitive to shock stresses and also have low strength for being wound.

When a sum current transformer is connected to the input of an amplifier, i.e. the power for the switching of a relay is not taken from the core itself, then it requires a relatively low transmission power and can therefore be implemented with small dimensions. The miniaturization of the dimensions is essentially limited by the mechanical weakening of the core of the sum current transformer associated with the dimension reduction and by the unavoidable increase in the ohmic resistance of the winding, since this must then be composed of relatively thin wires. This ohmic resistance of the winding of the core of the sum current transformer, however, is the determining factor for the gain of the following amplifier—among other things. Since the ohmic resistance changes with the temperature, the amplifier will also exhibit a temperature response, so that the precision of the trigger characteristic will suffer therefrom.

SUMMARY OF THE INVENTION

It is an object of the present invention to provide a sum current transformer that can have relatively small dimensions and that nonetheless has a mechanically solid core and a low temperature response.

This object is inventively achieved in that a sum current transformer having a core fashioned solid, i.e. without insulating intermediate layers or air gaps that divide the cross section of the core and the material of the core is composed of a metallic alloy having a content of at least 40% nickel which has a positive temperature coefficient for the electrical resistance.

DESCRIPTION OF THE PREFERRED EMBODIMENTS

Figure 1:
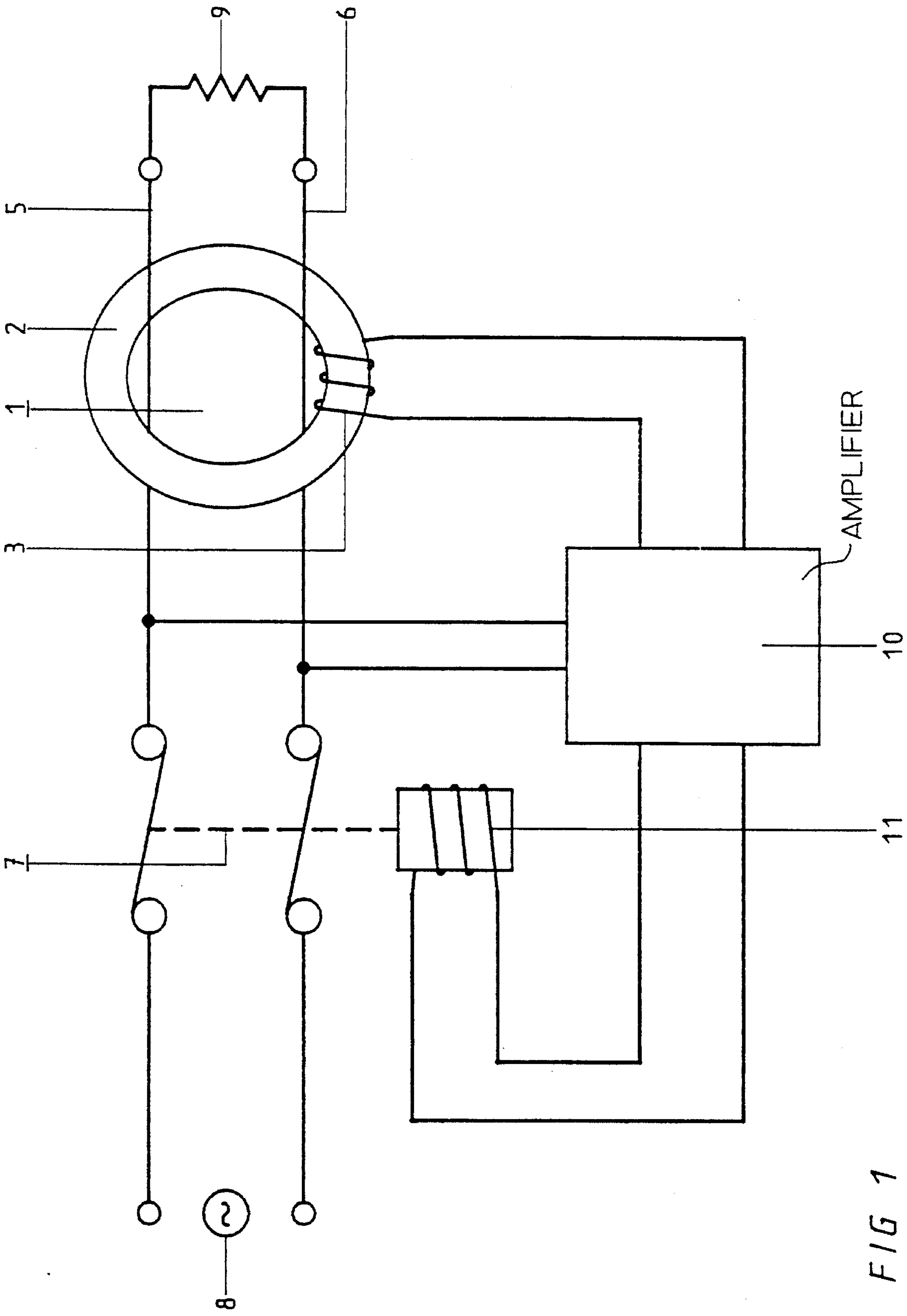
FIG. 1 shows a circuit using a sum current transformer constructed in accordance with the principles of the present invention used in a protective electronic means.

The sum current transformer 1 in FIG. 1 is composed of a core 2 having a winding 3. Current conductors 5 and 6 are conducted through the core, which connect an alternating voltage source 8 to a user 9 via a protective switch 7. The supply lines of an amplifier 10 are connected to the current conductors 5 and 6, the input lines of the amplifier 10 being connected to the winding 3 of the sum current transformer 1 and the output lines thereof being connected to the cutoff winding 11 of the protective switch 7.

When the aggregate current of the currents flowing through the current conductors 5 and 6 is not zero, for example as a consequence of a short to ground, then an alternating flux is generated in the core 2 of the sum current transformer 1, this alternating flux inducing a voltage in the winding 3 that in turn effects the triggering of the protective switch 7 via the amplifier 10.

Figure 2:
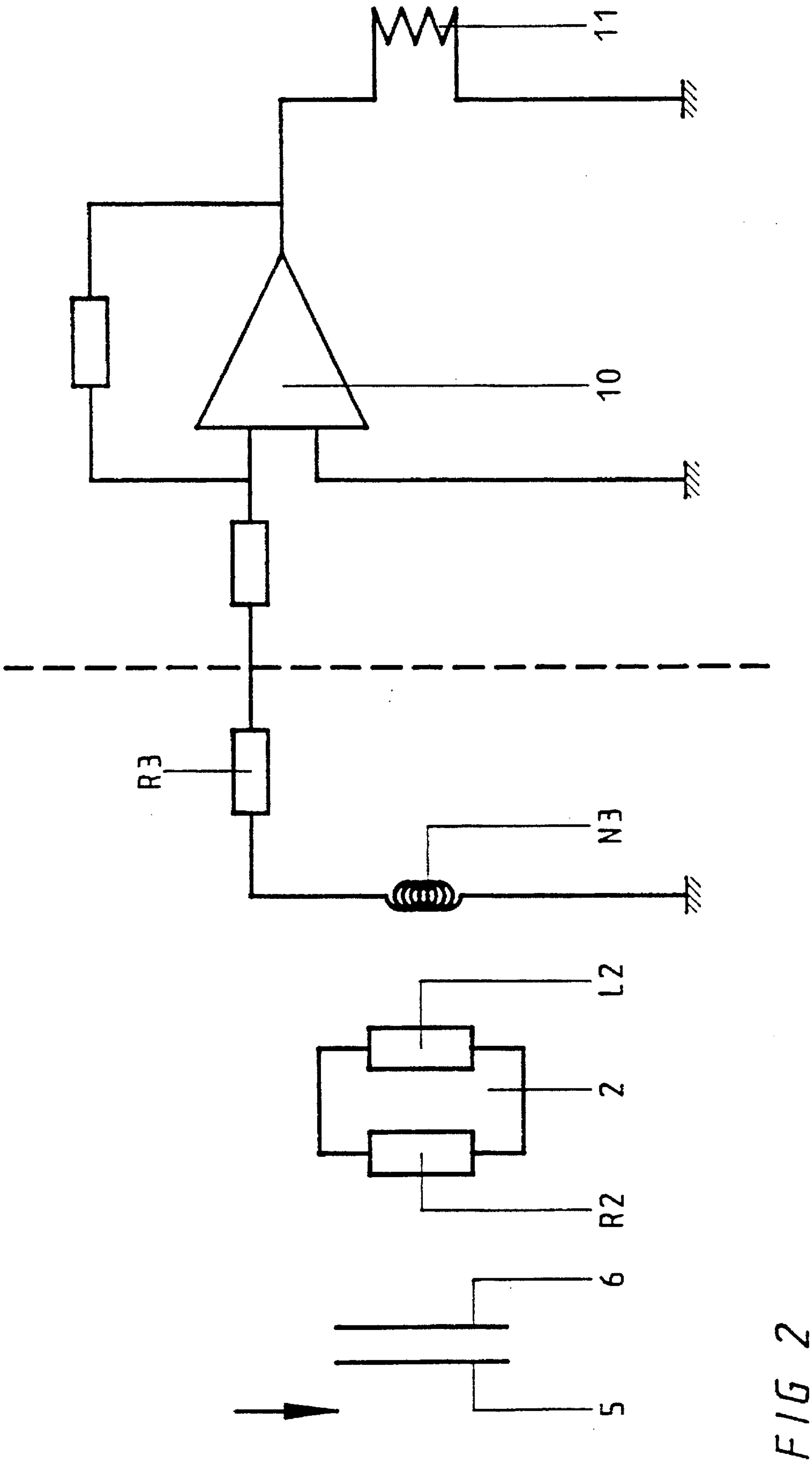
FIG. 2 shows an equivalent circuit diagram of the circuit of FIG. 1 for explaining the functioning thereof.

An equivalent circuit diagram for the circuit as shown in FIG. 2 is shown given the employment of a solid core composed of a metallic alloy having a high nickel content in accordance with the invention. Metallic nickel-iron alloys having a high nickel content have a magnetic permeability several orders of magnitude higher than required for employment as the core of sum current transformer. The core 2 thus has an extremely high inductance. Since, however, it is implemented solid, a flux in the core 2 causes eddy currents to propagate, since they are not impeded by air gaps or other insulating layers that divide a conventional core cross-section. These eddy currents generate an opposing field to the alternating field in the core 2 caused by the sum current; they are only limited by the electrical resistance of the material of which the core 2 is composed. In the equivalent circuit diagram, the core 2 is therefore illustrated by an ohmic resistor R2 and an inductor L2. In the equivalent circuit diagram of FIG. 2, the winding 3 is divided into an inductance N3 and a resistor R3 that represents the winding resistance of the winding.

It is assumed that the circuit in FIG. 2 is balanced such that a triggering of the protective switch 7 via the amplifier 10 ensues at the desired, maximum value of the sum current. When the ambient temperature then rises, the winding resistance R3 of the winding 3 also increases, so that the input voltage at the amplifier 10 would tend to drop. The resistance R2, however, also increases since the material of the core 2 has a positive temperature coefficient for the electrical resistance. The increase in the resistance R2 the eddy currents in the core 2 to abate and have less than an attenuating effect on the field generated by the sum current. This causes a higher alternating current permeability of the core 2 and leads to an increase of the induced voltage in the winding 3, and thus at the input of the amplifier 10. Temperature compensation of the circuit is possible by employing a solid core and by intentionally accepting significant eddy currents; it has been found in practice that the compensation is optimum when—dependent on the material employed and on the core shape—the wall thickness of the core 2 has a value in the range from 0.01–0.5 in relationship to the average diameter. The especially high static permeability of the inventively employed alloy having high nickel content also allows the core 2 to be formed in various geometrical shapes and/or to be divided into two or more core parts which in combination, compose the core 2.

Figure 3:
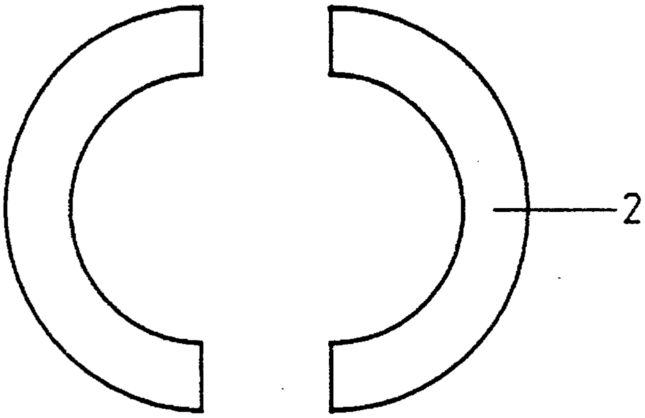
FIGS. 3–5 show further possible core shapes for a core constructed.
Figure 4:
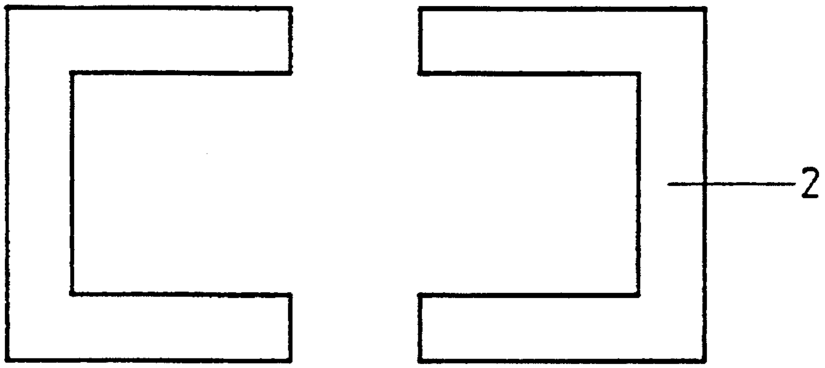
Figure 5:
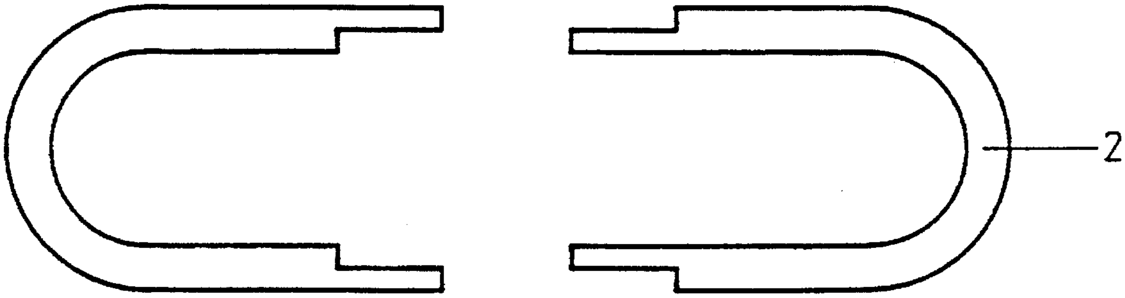

FIG. 3 shows a divided core in circular form; FIG. 4 shows such a core in rectangular form; and FIG. 5 shows a core of two U-halves that are overlapped when combined. These cores have the advantage that the winding is easier to apply in a known way and that they can be slipped over the core parts completely wound. Although the overlap region in FIG. 5 results in an air gap, however small being present on a part of the core, a significant reduction of the eddy currents does not thereby occur, so that the amplitude of the eddy currents continues to be nearly completely defined by the conductivity of the core material and the temperature-compensating effect is preserved.

The completely solid, undivided core shown in FIG. 1 can be fabricated by cutting a core of appropriate thickness from a tube. The tube from which the core is cut can be manufactured by an extrusion process. The divided cores shown in the embodiments of FIGS. 3–5 can also be cut from a tube as an undivided core, and then divided into the core halves respectively shown in FIGS. 3–5. Alternatively, the core halves can be separately fabricated.

Figure 6:
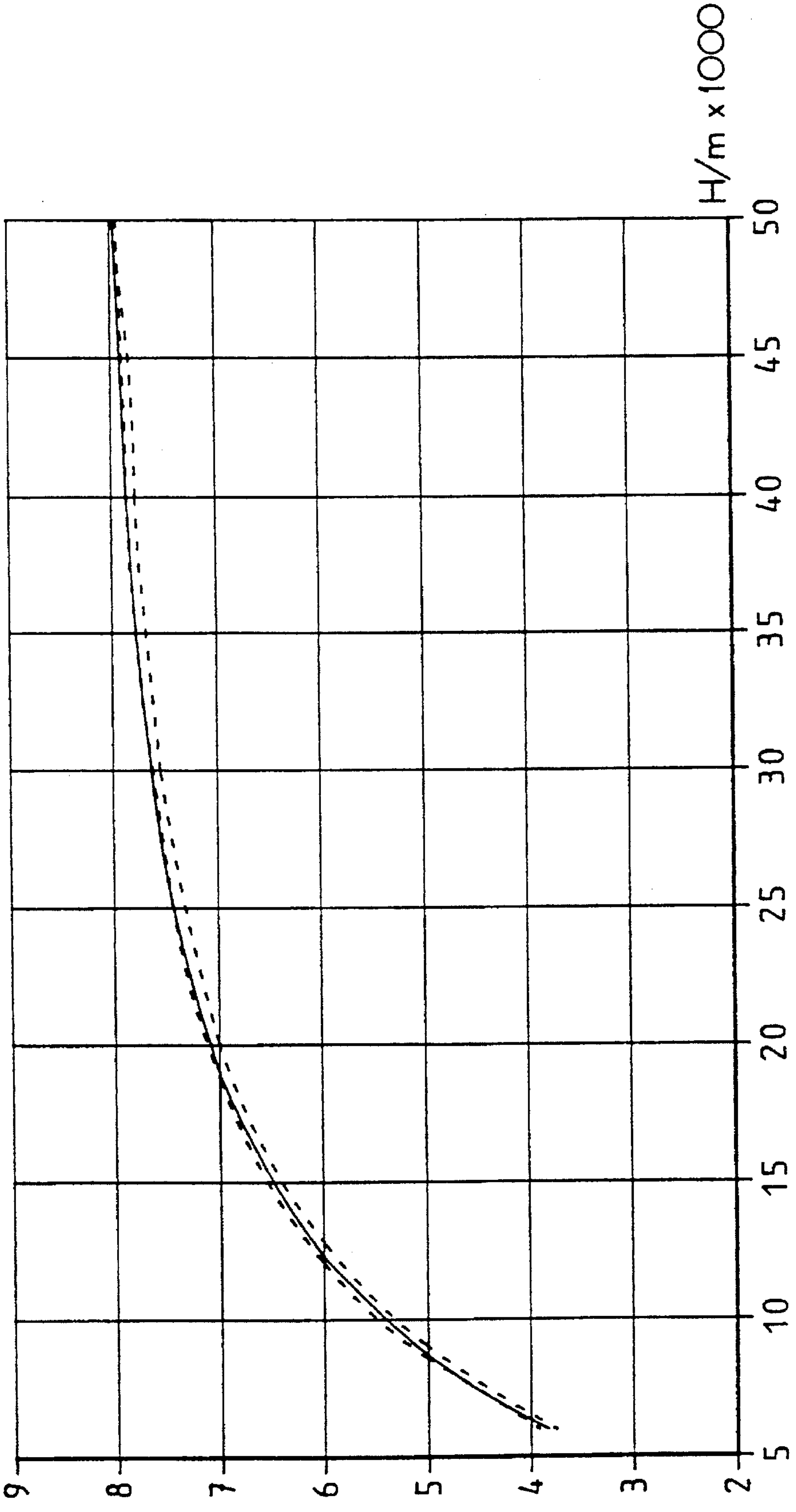
FIG. 6 shows the temperature response of an inventive core.

For an exemplary embodiment of an inventive core having 1,000 turns for the winding 3 and a winding resistance of 50 ohms as well as a core cross section of 0.03 $cm^2$ and an iron length of 4.15 cm, FIG. 6 shows the output voltage of the amplifier 10, i.e. the voltage at the winding 11 of the protective switch 7 dependent on the alternating current permeability that can arise due to different core materials different annealing treatments. The solid curve is thus the output voltage at room temperature; the dashed-line curves are respectively based on temperatures of +70° and −20° C. One can see, first, that an extremely good compensation of the temperature response is achieved and that, second a significant change in the output voltage no longer occurs given an alternating current permeability of more than 15,000 or 20,000, so that the attenuation of the static permeability of the core material employed for the temperature compensation in this application due to the eddy currents which occur in the massive core can be accepted.

The inventor has also recognized that the presence of eddy currents can be accepted under these circumstances because losses due to eddy currents in fact only occur when a fault, i.e. an aggregate current differing from zero, is present, so that a flux is present in the core 2 only briefly from the time of appearance of the fault until the disconnect of the protective switch 7. Heating of the core 2 during normal operation of the sum current transformer thus does not occur. By employing the inventive aggregate current transformer, a transformed is achieved having a core that is mechanically extremely strong and can be practically directly wound and moreover the temperature response caused by the ohmic resistance of the winding of the aggregate current transformer core can be compensated.

Although modifications and changes may be suggested by those skilled in the art, it is the intention of the inventors to embody within the patent warranted hereon all changes and modifications as reasonably and properly come within the scope of their contribution to the art.

I claim as my invention:

1. A sum current transformer comprising;

a core composed of a high-permeability, soft-magnetic metallic alloy having a content of at least 40% nickel and having a positive temperature coefficient for electrical resistance, said core being solid without any cross-sectional divisions;

a plurality of conductors, each carrying a current, passing through said core;

a winding wound around said core and having winding terminals;

amplifier means connected to said winding terminals for acquiring a sum of said currents carried by said conductors and for generating an output signal dependent on said sum; and a switch supplied with said output from said amplifier means, said switch having a plurality of switching states controlled dependent on said output from said amplifier means.

2. A sum current transformer as claimed in claim 1 wherein said core has a wall thickness and an average geometrical diameter, said wall thickness being not less than 0.01 times and not more than 0.5 times said average geometrical diameter.

3. A sum current transformer as claimed in claim 1 wherein said core is circular and comprises a section cut from a tube.

4. A sum current transformer as claimed in claim 1 wherein said core comprises an extruded core.

5. A sum current transformer comprising;

a core composed of a high-permeability, soft-magnetic metallic alloy having a content of at least 40% nickel and having a positive temperature coefficient for electrical resistance, said core comprising a plurality of core parts joined together, said core parts forming, in combination, a solid core with substantially no cross-sectional divisions;

a plurality of conductors, each carrying a current, passing through said core;

a winding wound around said core and having winding terminals;

amplifier means connected to said winding terminals for acquiring a sum of said currents carried by said conductors and for generating an output signal dependent on said sum; and a switch supplied with said output from said amplifier means, said switch having a plurality of switching states controlled dependent on said output from said amplifier means.

6. A sum current transformer as claimed in claim 5 wherein said core has a wall thickness and an average geometrical diameter, said wall thickness being not less than 0.01 times and not more than 0.5 times said average geometrical diameter.

7. A sum current transformer as claimed in claim 5 wherein said core is circular and comprises a section cut from a tube.

8. A sum current transformer as claimed in claim 5 wherein said core comprises an extruded core.

* * * * *